United States Patent [19]

Diehl et al.

[11] Patent Number: 4,877,721

[45] Date of Patent: Oct. 31, 1989

[54] PHOTOGRAPHIC SILVER HALIDE ELEMENTS CONTAINING FILTER DYES

[75] Inventors: Donald R. Diehl, Rochester; Ralph C. Reed, Brockport, both of N.Y.

[73] Assignee: Eastman Kodak Company, Rochester, N.Y.

[21] Appl. No.: 235,772

[22] Filed: Aug. 23, 1988

Related U.S. Application Data

[63] Continuation-in-part of Ser. No. 50,592, May 14, 1987, abandoned, which is a continuation-in-part of Ser. No. 863,667, May 15, 1986, abandoned.

[51] Int. Cl.$^4$ .................................................. G03C 1/84
[52] U.S. Cl. .................................... 430/522; 430/512; 430/517; 430/507
[58] Field of Search ............... 430/522, 507, 512, 517, 430/521, 576, 581

[56] References Cited

U.S. PATENT DOCUMENTS

| | | |
|---|---|---|
| 2,274,782 | 3/1942 | Gaspar ................................. 430/522 |
| 3,647,460 | 3/1972 | Hofman et al. ...................... 430/522 |
| 3,740,228 | 6/1973 | Ohlschlager et al. ............... 430/522 |
| 3,746,539 | 7/1973 | Ohmatsu et al. .................... 430/522 |
| 3,746,547 | 7/1973 | Tsuji et al. .......................... 430/522 |
| 3,795,519 | 3/1974 | Miyasako et al. ................... 430/522 |
| 3,930,860 | 6/1976 | Shiba et al. ......................... 430/522 |
| 3,932,188 | 1/1976 | Tanaka et al. ...................... 430/522 |
| 3,989,528 | 11/1976 | Sugiyama et al. ................. 430/522 |
| 4,500,631 | 2/1985 | Sakamoto et al. .................. 430/522 |
| 4,587,195 | 5/1986 | Ishikawa et al. .................... 430/139 |

Primary Examiner—Jack P. Brammer
Attorney, Agent, or Firm—Paul L. Marshall

[57] ABSTRACT

A methine oxonol dye having a bis-(2-pyrazolin-5-one nucleus) substituted with
(a) acyl groups in the 3 and 3' position;
(b) aryl groups in the 1 and 1' position; and
(c) bearing from 4 to 6 acidic substituents, each of which are capable of forming a monovalent anion provided that at least two of such substituents are other than carboxyl, is disclosed for use as filter dyes in photographic elements.

9 Claims, No Drawings

PHOTOGRAPHIC SILVER HALIDE ELEMENTS CONTAINING FILTER DYES

This is a continuation-in-part of application Ser. No. 050,592, filed May 14, 1987, now abandoned, which is a continuation-in-part of earlier filed application Ser. No. 863,667, filed on May 15, 1986, now abandoned.

FIELD OF THE INVENTION

This invention relates to filter dyes and their use in photographic elements.

BACKGROUND OF THE INVENTION

The use of filter dyes in photographic elements for the absorption of unwanted radiation is known.

Filter dyes may be located in several locations in an element. They may be in a radiation-sensitive layer, an overcoat layer, in a layer adjacent to the radiation-sensitive layer, in an interlayer in a multilayer element, in an undercoat layer adjacent to the support or in a backing layer on the side of the support opposite the radiation-sensitive layer.

When incorporated directly in the radiation-sensitive layer they can function to improve sharpness by absorbing light scattered from one silver halide grain to another. Such dyes are referred to as absorber dyes. Absorber dyes also function to retard the sensitivity of one light sensitive layer relative to another in a multilayer element. By absorbing some of the exposing radiation the filter dye aids in balancing the sensitivities of all the light sensitive layers. A particular problem often associated with absorber dyes is the desorption of spectral sensitizing dyes from the grain surface. This is referred to an unsensitization.

Absorber dyes used in the red sensitive layer are often called cyan absorber dyes (cyan colored dyes which absorb red light). A currently used absorber dye in the red sensitive layer of a multilayer color photographic element is the anthraquinone dye "Sulfomethyl Blue". While this dye is very soluble and wahses out very rapdily during photographic processing, its use results in the buildup of sludge in the processing solutions, which is a particular disadvantage in high volume processors.

Filter dyes that function primarily to absorb unwated radiation due to reflection or refraction from layer interfaces, the layer-support interface, and particularly from the back side of the support, are referred to as antihalation dyes. The layers that contain them are referred to as antihalation layers.

The choice of filter dyes or other radiation absorbing compounds and their location in an element depend on a number of factors. A suitable dye must satisfy several requirements. The dye must of course absorb light in the desired spectral region. Frequently, it is also important that the dye not absorb radiation in other spectral regions. To be incorporated in an element, it is sometimes important that the dye be water soluble. It is usually important that the dye not migrate from the layer in which it is incorporated during or after coating. It preferably should not have adverse effects on the light sensitive layer. This is particularly important for an absorber dye. It is almost always important that the dye be easily and completely bleached or otherwise removed from the element during processing, and not be regenerated. This last requirement is important since residual dye in the coating is a source of objectionable stain.

Dye stain continues to be a problem associated with filter dyes. This problem is exacerbated by trends in the photographic industry to systems with very short processing times. Shortened processing times in, for example, x-ray and microfilm processing systems, necessitate shortened wash times, which mean less time for dye removal.

It is an objective of this invention to provide filter dyes for photographic elements which meet the foregoing requirements for filter dyes and that also do not cause post process dye stain or sludge.

SUMMARY OF THE INVENTION

The foregoing objective has been achieved with a methine oxonol dye having a bis-(2-pyrazolin-5-one nucleus) substituted with (a) acyl groups in the 3 and 3' position;

(b) aryl groups in the 1 ad 1' position; and (c) bearing from 4 to 6 acidic substituents each of which are capable of forming a monovalent anion provided that at least two of such substituents are other than carboxyl.

EMBODIMENTS OF THE INVENTION

In one embodiment, the dyes of the invention have the structure

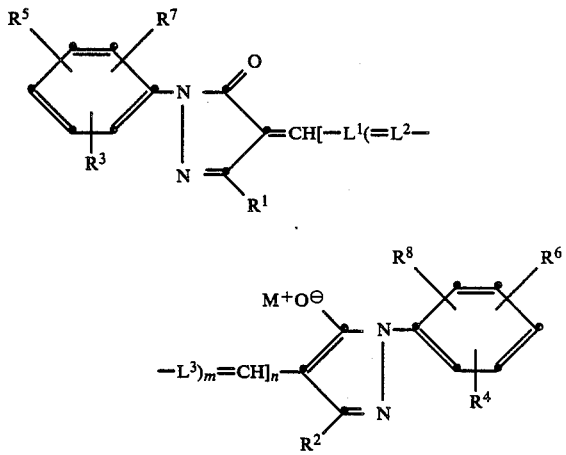

wherein $R^1$ and $R^2$ represent an aliphatic, alicyclic or aromatic acyl group such as acetyl, propanoyl, octanoyl, dodecanoyl, cyclopropylcarbonyl, benzoyl, etc.;

$R^3$, $R^4$, $R^5$, $R^6$, $R^7$ and $R^8$ each represent hydrogen or an acidic substituent capable of forming an anion such as carboxy, sulfo, sulfato, thiosulfato, etc., provided that at least four of $R^3$, $R^4$, $R^5$, $R^6$, $R^7$ and $R^8$ are acidic groups and at least two of such acidic groups are other than carboxy;

$L^1$, $L^2$ and $L^3$ each represent CH or CR where R is alkyl of up to four carbons; and $M^+$ represents hydrogen or other monovalent cation; and m and n each may be 0 or 1.

In another embodiment, the dyes of this invention have the structure

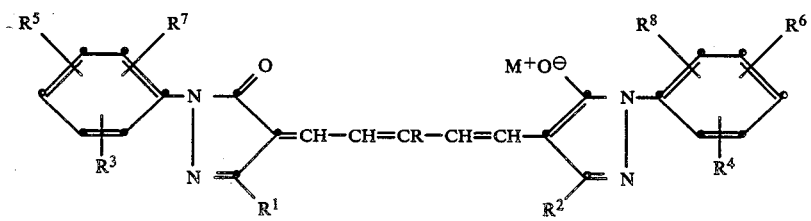

wherein

R is hydrogen or a lower alkyl of up to 4 carbon atoms;

$R^1$ and $R^2$ represent an aliphatic or alicyclic acyl group such as acetyl, propanoyl, octanoyl, dodecanoyl, cyclopropylcarbonyl, benzoyl, etc.;

$R^3$, $R^4$, $R^5$, $R^6$, $R^7$ and $R^8$ each represent hydrogen or an acidic substituent capable of forming an anion such as carboxyl, sulfo, sulfato, thiosulfato, etc., provided that (a) at least four of $R^3$, $R^4$, $R^5$, $R^6$, $R^7$ and $R^8$ must be acidic substituents and (b) at least two of such acidic groups are other than carboxy; and $M^+$ represents hydrogen or a monovalent cation.

DETAILS OF THE INVENTION

In the foregoing structure, the dyes represented by the formula where both m and n=0 absorb in the blue spectral region (400–500 μm). They are useful as blue filter dyes and as absorber dyes in a blue sensitive layer. The dyes represented by the formula where m=0 and n=1 absorb light in the green spectral region (500–600 μm). They are useful as green filter dyes and as absorber dyes in a green sensitive layer. The dyes represented by the formula where both m and n=1 absorb light in the red spectral region (600–700 μm). They are useful as red filter dyes and as absorber dyes in a red sensitive layer.

The dyes of the invention absorb in the long wavelength areas of their respective spectral regions, have relatively high absorption maxima and narrower overall absorptions. This is desirable since less interference to light of the other spectral regions, yields more light for exposure of the light sensitive layers. The combination of the 1-aryl and 3-acyl substituents help to assure this attribute of the dyes. Further adjustments can be made in the absorption maximum and the absorption curve by variations in the substituents.

The acidic substituents improve water solubility which contributes to ease of dye removal during processing. Surprisingly, the combination of acidic substituents and the acyl substituents result in significantly greater bleachability than in dyes with seemingly closely related structures. It was also a distinct surprise to find that these dyes with the 3-acyl substituents, when used as absorber dyes, shows a much reduced tendency to unsensitize.

Other related red absorbing dyes have been described in U.S. Pat. No. 3,930,860, and U.S. Pat. No. 3,647,460. These dyes however cause unsensitization, limiting seriously the type of sensitizing dyes that can be used with them. It was a distinct surprise to find that the dyes of this invention, featuring the 3-acyl substituents, did not cause unsensitization and yet had all the other desired advantages.

The photographic elements in which the dyes of this invention are useful can be both black and white or single color or multicolor photographic elements. The dyes can be located in any layer of a photographic element where it is desired to absorb light in the region of the spectrum in which the dyes of the invention absorb light, but they are particularly advantageously utilized in layers of an element where they can be bleached or washed out of the element during processing. The amount of dye will vary with the amount of light that is desired to be absorbed. For example, if a very small amount of light is desired to be absorbed, only a small amount of dye would be used. The dyes of the invention are preferably present in photographic elements in an amount of from 1 to 1000 mg/m².

Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer, e.g., as by the use of microvessels as described in Whitmore, U.S. Pat. No. 4,362,806, issued Dec. 7, 1982.

A typical multicolor photographic element would comprise a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler and a yellow dye image-forming unit comprising at least one blue-sensitive silver halide emulsion layer having associated therewith at least one yellow dye-forming coupler. The element can contain additional layers, other filter layers, interlayers, overcoat layers, subbing layers, and the like.

In the following discussion of suitable materials foruse in the emulsions and elements of this invention, reference will be made to *Research Disclosure*, December 1978, Item 17643, published by Kenneth Mason Publications, Ltd., The Old Harbourmaster's, 8 North Street, Emsworth, Hampshire PO10 7DD, ENGLAND, the disclosures of which are incorporated herein by reference. This publication will be identified hereafter by the term "*Research Disclosure*".

The silver halide emulsions employed can be either negative-working or positive-working. Suitable emulsions and their preparation are described in *Research Disclosure* Sections I and II and the publications cited therein. Suitable vehicles for the emulsion layers and other layers are described in *Research Disclosure* Section IX and the publications cited therein.

In addition to the couplers the elements can include additional couplers as described in *Research Disclosure* Section VII, paragraphs D, E, F and G and the publications cited therein. These couplers can be incorporated in elements and emulsions as described in *Research Dis-* closure Section VII, paragraph C and the publications cited therein.

The photographic elements or individual layers thereof, can contain brighteners (see Research Disclosure Section V), antifoggants and stabilizers (see *Research Disclosure* Section VI), antistain agents and image dye stabilizer (see *Research Disclosure* Section VII, paragraphs I and J), light absorbing and scattering materials (see *Research Disclosure* Section VIII), hardeners (see *Research Disclosure* Section XI), plasticizers and lubricants (see *Research Disclosure* Section XII), antistatic agents (see *Research Disclosure* Section XIII), matting agents (see *Research Disclosure* Section XVI) and development modifiers (see *Research Disclosure* Section XXI).

The photographic elements can be coated on a variety of supports as described in *Research Disclosure* Section XVII and the references described therein.

Photographic elements can be exposed to actinic radiation, typically in the visible region of the spectrum, to form a latent image as described in *Research Disclosure* Section XVIII and then processed to form a visible dye image as described in *Research Disclosure* Section XIX. Processing to form a visible dye image includes the step of contacting the element with a color developing agent to reduce developable silver halide and oxidize the color developing agent. Oxidized color developing agent in turn reacts with the coupler to yield a dye.

Methods of making the oxonol dyes of this invention are disclosed, for example, in U.S. Pat. No. 2,274,782, as well as in other patent literature. Example 1 illustrates one method for making the dyes.

EXAMPLE 1

Step 1—Preparation of 3-Acetyl-1-(2,5-disulfophenyl)-2-pyrazolin-5-one Intermediate $C_{11}H_8N_2Na_2O_8S_2$: mw=406.3

2-Amino-1,4-benzenedisulfonic acid (25.2 g, 0.10 mol) was suspended in water (100 ml) to form a slurry. Sodium carbonate (5.2 g, 0.05 mol) was added. The resulting solution was chilled to 2° C. and sodium nitrate (6.9 g, 0.10 mol) was added. After ten minutes stirring a solution, prepared by the dilution of concentrated hydrochloric acid (25 ml) in cold water (100 ml), was added slowly. Stirring at 2° C. was continued after the addition for thirty minutes. The mixture was then poured into a solution of 3-acetyl-4-oxopentanoic acid, ethyl ester (20.4 g, 0.11 mol) in 50% aqueous pyridine (200 ml). This was stirred at room temperature for one hour. The mixture was heated to 90° C. and stirring was continued at that temperature for another hour. It was then concentrated under reduced pressure to near dryness and the residue dissolved in 10% aqueous sodium bicarbonate. The aqueous solution was extracted with dichloromethane. The aqueous phase was treated with 10% aqueous sodium hydroxide to achieve a pH of 10 and this was heated at reflux for one hour. After cooling to room temperature the solution was poured into acetone (500 ml) resulting in formation of a brown gummy precipitate containing the product. The supernatent liquid was decanted and the precipitate was extracted repeatedly with methanol. Concentration of the combined methanol extracts to dryness yielded the solid product. The yield was 8.67 g which was 21% of the theoretically possible yield. The tan powder is very hydroscopic and has a melting point above 310° C.

Step 2—Preparation of Bis[3-acetyl-1-(2,5-sulfophenyl)-2-pyrazolin-5-one-(4)-pentamethineoxonol, Pentasodium Salt (Dye 1)

$C_{27}H_{17}N_4Na_5O_{16}S_4$: mw=896.43

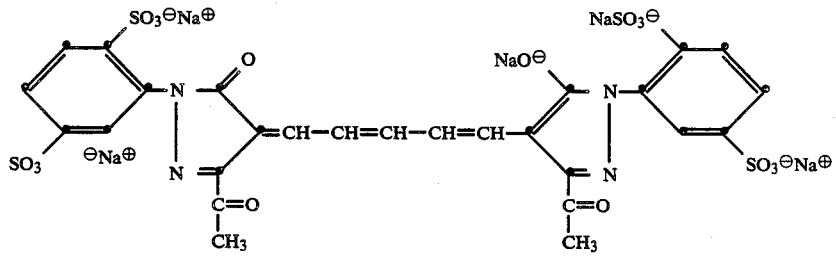

Glutacondialdehyde dianil hydrochloride (1.5 g., 0.0053 mole) was suspended in ethanol (20 ml). Triethylamine (3.0 ml) was added. The mixture was stirred at room temperature for three minutes. Finely pulverized 3-acetyl-1-(2,5-disulfophenyl)-2-pyrazolin-5-one (3.3 g, 0.0091 mole) prepared as above was added at once. The reaction mixture was heated under nitrogen to reflux. Reflux was maintained there for one hour. Additional amounts of glutacondialdehyde dianil hydrochloride (1.5 g, 0.0053 mole) and ethanol (20 ml) were added. Refluxing was continued for another two hours. Another portion of ethanol (20 ml) was added. The mixture was allowed to cool to room temperature. The crude product was isolated by filtration, washed with ethanol and dried under vacuum at 60° C. for one hour. Yield 2.25 g. The crude dye was suspended in methanol (50 ml) and the suspension refluxed for thirty minutes. After cooling to room temperature the product was again isolated by filtration, washed with methanol (25 ml) and ethanol (50 ml), and dried as before. Yield 1.1 g.

The dye was converted to the pentasodium salt by dissolving it in water (2 ml). This solution was added to a solution of sodium iodide (3.0 g, 0.002 mole) in methanol (10 ml). After further dilution with methanol (10 ml) the solution was stirred at room temperature for ten minutes. It was then chilled for thirty minutes. A crystalline product precipitated. It was isolated by filtration, washed with methanol (10 ml) and ethanol (25 ml) in sequence and dried as before. Yield 0.51 g which was 14% of theoretical. The purity of the dye was established by thin layer chromatography and by paper electrophoresis. λ-max (MeOH)=658 nm and λ-max ($H_2O$)=648 nm. ε-max ($H_2O$)=$10.8 \times 10^4$.

EXAMPLE 2

Preparation of
Bis[3-acetyl-1-(2,5-disulfophenyl)-2-pyrazolin-5-one-(4)]-trimethineoxonol, pentasodium salt-Dye 2

$C_{25}H_{15}N_4Na_5O_{16}S_4$: mw=870.59

3-Acetyl-1-(2,5-disulfophenyl)-2-pyrazolin-5-one (13.8 g, 0.034 mol), as prepared in Step 1 of Example 1, anilinoacroleinanil hydrochloride (5.0 g, 0.015 mol) and triethylamine (6.0 g, 0.060 mol) were combined in methanol (60 ml) and heated at reflux with constant stirring for eighteen hours. Sodium iodide (9.0 g, 0.060 mol), dissolved in methanol (25 ml), was added and the refluxing was continued for another hour. The reaction mixture was then cooled to room temperature, the solid was collected by filtration, washed on the funnel with methanol (100 ml) and acetone (100 ml) in succession, and dried under vacuum at 15 mm Hg and 60° C. The yield of dark red-brown product was 9.9 g. The dye was further purified by multiple recrystallizations from methanol-acetone solvent mixtures. The infrared spectrum was in agreement with the assigned structure. The purity of the dye was established by thin layer chromatography and paper electrophoresis. λ-max in water=551 nm, ε-max=6.44×10$^4$.

EXAMPLE 3

Preparation of
Bis[3-propionyl-1-(2,5-disulfophenyl)-2-pyrazolin-5-one-(4)]-pentamethineoxonol, Pentasodium Salt (Dye 3)

$C_{29}H_{21}N_4Na_5O_{16}S_4$: mw=924.71

A slurry of 4.2 g 1-(2,5-disulfophenyl)-3-propionyl-2-pyrazolin-5-one, disodium salt and 1.28 g glutacondialdehyde dianil hydrochloride in 25 ml dimethylformamide was warmed to 40° C. and 2.5 g triethylamine was added. The mixture was stirred at room temperature for 30 minutes and filtered. The precipitate was washed with 10 ml dimethylformamide, 10 ml methanol, 50 ml ethanol, and 50 ml lignoin. The precipitate was then dried to yield 2.57 g of a gray green powder. 1.0 g of this powder was dissolved in 10 ml water, then 1.0 g sodium iodide was added and the mixture was stirred at room temperature for 15 minutes. This mixture was added with rapid stirring to 100 ml isopropyl alcohol, stirred at room temperature for 30 minutesand filtered. The precipitate was washed with 50 ml isopropyl alcohol and dried to yield dye 3. The purity of the dye was established by thin layer chromatography and paper electrophoresis. The λ-max in water was 648 ηm and the ε-max was 13.9×10$^4$.

EXAMPLE 4

Preparation of
Bis[3-propionyl-1-(2,5-disulfophenyl)-2-pyrazolin-5-one-(4)]-trimethineoxonol, Pentasodium Salt (Dye 4)

$C_{27}H_{19}N_4Na_5O_{16}S_4$: mw=898.67

To a solution of 1.4 g 1-(2,5-disulfophenyl)-3-propionyl-2-pyrazolin-5-one, disodium salt and 0.4 g anilinoacrolein-anil-hydrochloride in 10 ml dimethylformamide, 1.0 g triethylamine was added. The mixture was stirred at room temperature for 24 hours and then heated to 100° C. for 1 hour and 1.0 g sodium iodide was added. The mixture was then cooled to 50° C., 5 ml methanol and 40 ml ethanol was added, stirred for 15 minutes, and a bronze precipitate was filtered out. The precipitate was washed with 3 ml dimethylformamide, 5 ml methanol, 50 ml ethanol, 50 ml acetone, and then dried to yield Dye 4. The purity of the dye was established by thin layer chromatography and paper electrophoresis. The λ-max in water was 556 ηm and the ε-max was 8.00×10$^4$.

EXAMPLE 3

Preparation of
Bis[3-acetyl-1-(2,5-disulfophenyl)-2-pyrazolin-5-one-(4)]-monomethineoxonol, Pentasodium Salt (Dye 5)

$C_{25}H_{13}N_4Na_5O_{16}S_4$: mw=872.63

3-Acetyl-1-(2,5-disulfophenyl)-2-pyrazolin-5-one (1.2 g), was mixed with 2 g diethoxymethylacetate, 10 ml dimethylformamide, and 1 ml triethylamine, and warmed to 50° C. for 5-10 minutes with constant stirring. A solution of 1 g sodium iodide in 10 ml methanol was added and the mixture was warmed again to 50° C. for 10 minutes. An excess of acetone (approximately 50 ml) was added and the resulting yellow brown precipitate was filtered out and dried. The dry precipitate was then dissolved in 20 ml methanol, filtered to remove particulates, and 3 g sodium iodide was added to the soluton, causing a precipitate to form. The mixture was stirred for 15 minutes, and the precipitate filtered, washed with acetone, and dried to yield Dye 5. The purity of the dye was established by thin layer chromatography and paper electrophoresis. The λ-max in water was 478.8 ηm and the ε-max was 1.95×10$^4$.

EXAMPLE 6

Preparation of
Bis[3-acetyl-1-(2,4-disulfophenyl)-2-pyrazolin-5-one(4)]-pentamethineoxonol, Pentasodium Salt (Dye 6)

$C_{27}H_{17}N_4Na_5O_{16}S_4$: mw=968.72

A slurry of 5.0 g 3-acetyl-1-(3,5-disulfophenyl)-2-pyrazolin-5-one, disodium salt, 1.14 g glutacondialdehyde dianilhydrochloride, and 20 ml dimethylformamide was stirred for 10 minutes at 45° C. and 2.5 g trethylamine was added. After 3½ hours, a solution of 2.2 g sodium iodidein 40 ml methanol was added. The mixture was tirred at 45° C. for 15 minutes and filtered. The precipitate was washed with dimethylformamide and then dissolved with methanol. The methanol solution was then poured into 200 ml isopropyl alcohol, stirred for 15 minutes, and the precipitate filtered out. The precipitate was washed with 50 ml ethanol, 100 ml lignoin, and dried. 2.0 g of this precipitate was dissolved in 5.0 ml water and 2.0 g of sodium iodide was added. This solution was stirred for 20 minutes, during which time a bronze precipitate formed. The mixture was filtered, the precipitate was washed with 25 ml methanol, and then dried. The purity of the dye was established by thin layer chromatography and paper electrophoresis. The λ-max in water was 646 ηm and the ε-max ws 11.62×10$^4$.

EXAMPLE 7

Preparation of
Bis[3-acetyl-1-(2,4-disulfophenyl)-2-pyrazolin-5-one-(4)]-trimethineoxonol, Pentasodium Salt (Dye 7)

$C_{25}H_{15}N_4Na_5O_{16}S_4$: mw=906.64

To a solution of 4.0 g 3-acetyl-1-(3,5-disulfophenyl)-2-pyrazolin-5-one, disodium salt and 0.95 g anilinoacrolein anilhydrochloride in 20 ml dimethylformamide, 2.0 g triethylamine was added. The reaction mixture was stirred at room temperature, and then heated to 100° C. for 1 hour. After this time, 2.0 g of 3-acetyl-1-(3,5-disulfophenyl)-2-pyrazolin-5-one, disodium salt was added, and the mixture was maintained at 100° C. for another 30 minutes, during which time a reddish bronze precipitate formed. Heating was discontinued, 3.0 g sodium iodide was added, and the mixture was stirred at room temperature for 5 minutes. During continuous stirring at room temperature, 40 ml ethanol was added after 15 minutes. After an additional 15 minutes, the mixture was filtered. The precipitate was washed successively with 3 ml dimethylformamide, 10 ml methanol, 50 ml ethanol, 50 ml acetone, and dried to yield dye 7. The purity of the dye was established by thin layer chromatography and paper electrophoresis. The λ-max in water was 555 ηm and the ϵ-max was $8.93 \times 10^4$.

EXAMPLE 8

Preparation of Bis[3-propionyl-1-(2,5-disulfophenyl)-2-pyrazolin-5-one-(4)]-3-methylpentamethineoxonol, Pentasodium Salt (Dye 8)

$C_{30}H_{23}N_4Na_5O_{16}S_4$: mw=938.73

To a slurry of 2.1 g of 1-(2,5-disulfophenyl)-3-propionyl-2-pyrazolin-5-one, disodium salt in 10 ml dimethylformamide, 1.25 g triethylamine was added and stirred at 45° C. 0.9 g 3-methylglutacondialdehyde dianilbromide was then added and the mixture was stirred for 1 hour. A solution of 2.5 g sodium iodide in 40 ml acetone was then added dropwise over 10 minutes. This mixture was stirred at 50° C. for 15 minutes and the resulting precipitate was filtered to yield crude dye 8, which gave an absorbance peak at λ=688 ηm, along with ultraviolet absorption from the impurities.

EXAMPLE 9

Preparation of Bis[3-acetyl-1-(2,5-disulfophenyl)-2-pyrazolin-5-one-(4)]-2-methyltrimethineoxonol, Pentasodium Salt (Dye 9)

$C_{26}H_{17}N_4Na_5O_{16}S_4$: mw=884.64

To a solution of 2.0 g 3-acetyl-2,5-disulfophenylpyrazolone and 0.68 g 2-methylanilinoacrolein anilhydrochloride in 15 ml dimethylformamide, 5 ml of methanol and then 1.0 g triethylamine was added. The mixture was stirred at room temperature for 2 hours, after which a solution of 1.5 g sodium iodide in 15 methanol was added. 150 ml of acetone was then added, causing formation of a precipitate, which was filtered, washed with ethanol, acetone, and lignoin, and then dried to yield crude dye 9. This dye gave a λ-max of 568 ηm, along with ultraviolet absorption from the impurities.

Other dyes which could be made within the scope of this invention and which would be expected to provide the improvements in multilayer color photographic elements are presented in Table I.

TABLE I

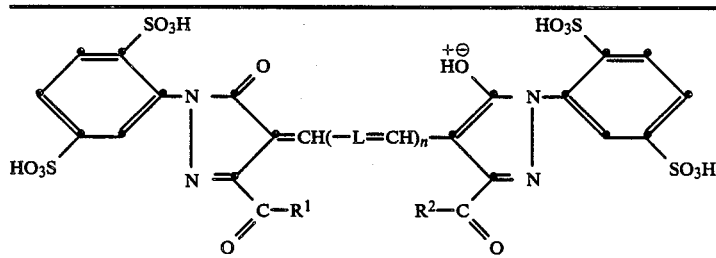

10a  Bis[3-acetyl-1-(2,5-disulfophenyl)-2-pyrazolin-5-one-(4)]-trimethineoxonol
n = 1, L = CH and $R^1 = R^2 = CH_3$
10b  Bis[3-benzoyl-1-(2,5-disulfophenyl)-2-pyrazolin-5-one-(4)]-pentamethineoxonol
n = 2, L = CH and $R^1 = R^2 = C_6H_5$
10c  Bis[1-(2,5-disulfophenyl)-3-(4-tolyl)-2-pyrazolin-5-one-(4)] pentamethineoxonol
n = 2, L = CH and $R^1 = R^2 = p\text{-}CH_3C_6H_5$
10d  Bis[3-acetyl-1-(2,5-disulfophenyl)-2-pyrazolin-5-one-(4)]-3-methylpentamethineoxonol
n = 2, L = CR where R = $CH_3$ and $R^1 = R^2 = CH_3$

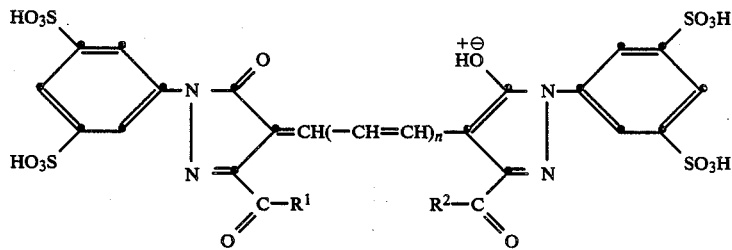

11a  Bis[3-acetyl-1-(3,5-disulfophenyl)-2-pyrazolin-5-one-(4)]-monomethineoxonol
n = O and $R^1 = R^2 = CH_3$
11b  Bis[3-acetyl-1-(3,5-disulfophenyl)-2-pyrazolin-5-one-(4)]-trimethineoxonol
n = 1 and $R^1 = R^2 = CH_3$
11c  Bis[3-acetyl-1-(3,5-disulfophenyl)-2-pyrazolin-5-one-(4)]-pentamethineoxonol

TABLE I-continued n = 2 and $R^1 = R^2 = CH_3$

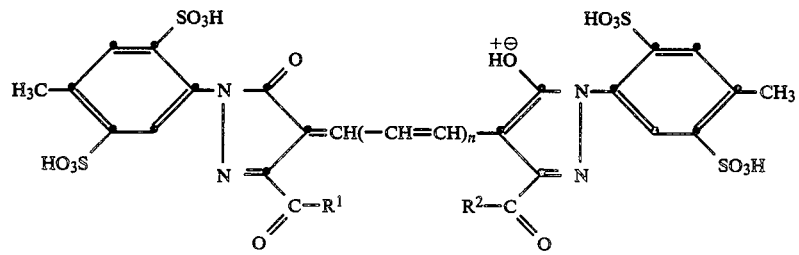

| 12 | Bis[3-acetyl-1-(4-methyl-2,5-disulfophenyl)-2-pyrazolin-5-one-(4)]pentamethineoxonol<br>n = 2 |

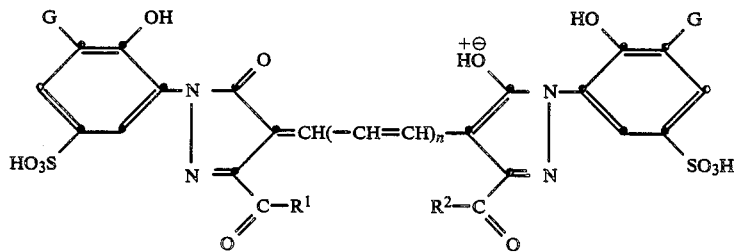

| 13a | Bis[3-acetyl-1-(2-hydroxy-3,5-disulfophenyl)-2-pyrazolin-5-one-(4)]pentamethineoxonol<br>n = 2 and G = $SO_3H$ |
| 13b | Bis[3-acetyl-1-(3-carboxy-2-hydroxy-5-sulfophenyl)-2-pyrazolin-5-one-(4)]pentamethineoxonol<br>n = 2 and G = COOH |

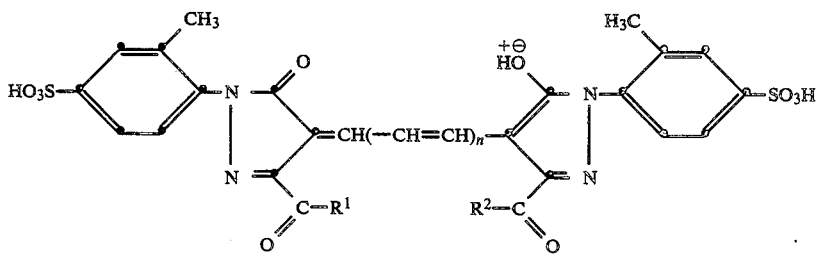

| 14a | Bis[3-acetyl-1-(2-methyl-4,5-disulfophenyl)-2-pyrazolin-5-one-(4)]pentamethineoxonol<br>$G^1 = SO_3H$, $G^2 = H$ and n = 2 |
| 14b | Bis[3-acetyl-1-(2-methyl-4,6-disulfophenyl)-2-pyrazolin-5-one-(4)]pentamethineoxonol<br>$G^1 = H$, $G^2 = SO_3H$ and n = 2 |

EXAMPLE 10

Evaluation of 2-Pyrazolin-5-one Pentamethineoxonol Dyes as Cyan Absorber Dyes Dye 1 (Example 1) was evaluated in a multi-layer color silver halide photographic element. The element consisted of a resin coated paper support on which were coated, in order, a blue sensitive layer, an interlayer, a green sensitive layer, an interlayer and an ultraviolet absorbing layer. Dye 1 was added to a red sensitive emulsion containing the spectral sensitizing dye

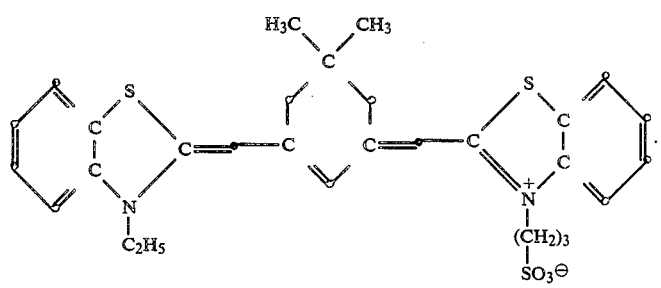

The emulsion was then coated over the ultraviolet absorbing layer. The element was then provided with a gelatin overcoat layer. Samples of the coatings were exposed in a spectrophotometer to a quartz-halogen light source through a Wratten 80B color correcting filter, a diffraction grating with filters to remove second order transmission, and a superimposed step wedge. Other samples of the coating were exposed to the 365 nm mercury line and still others were exposed only to red light. The coatings were developed for 3½ minutes, fixed and washed in the Kodak EP-2 process, and dried.

Another coating was prepared in the manner described above, except that the absorber dye was omitted, samples of which were exposed and processed in the same way.

To demonstrate the unexpected performance of the dyes of this invention, multilayer color silver halide photographic elements were prepared exactly as above. However a prior art oxonol dye, such as disclosed in U.S. Pat. Nos. 3,930,860 and 3,647,460 was used in the red sensitive emulsion layer instead of a dye of this invention. The performance of the dyes of the prior art, compared to the performance of Dye 1 is shown in Table II. The structure of the prior dyes, designated as Ia–Ib; IIa–IIh and IIIa–IIIc are given below.

Dye I

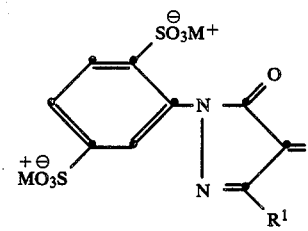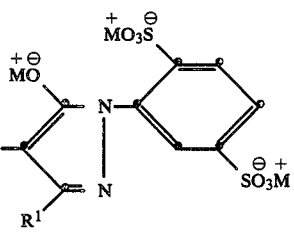

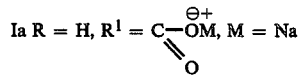
Ia R = H, R$^1$ = C—OM, M = Na

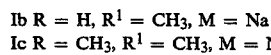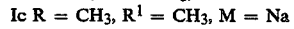
Ib R = H, R$^1$ = CH$_3$, M = Na
Ic R = CH$_3$, R$^1$ = CH$_3$, M = Na Dye II

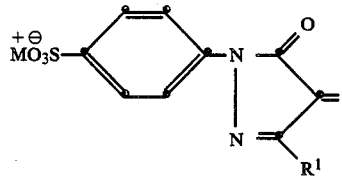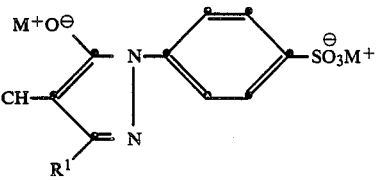

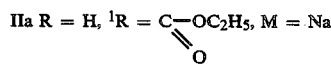
IIa R = H, $^1$R = C—OC$_2$H$_5$, M = Na

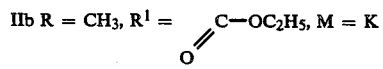
IIb R = CH$_3$, R$^1$ = C—OC$_2$H$_5$, M = K

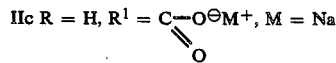
IIc R = H, R$^1$ = C—O$^\ominus$M$^+$, M = Na

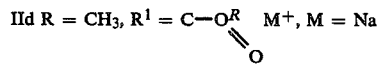
IId R = CH$_3$, R$^1$ = C—O$^R$ M$^+$, M = Na

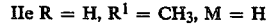
IIe R = H, R$^1$ = CH$_3$, M = H

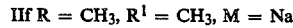
IIf R = CH$_3$, R$^1$ = CH$_3$, M = Na

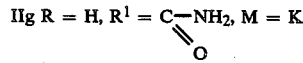
IIg R = H, R$^1$ = C—NH$_2$, M = K

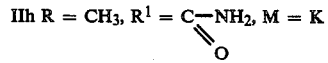
IIh R = CH$_3$, R$^1$ = C—NH$_2$, M = K

Dye III

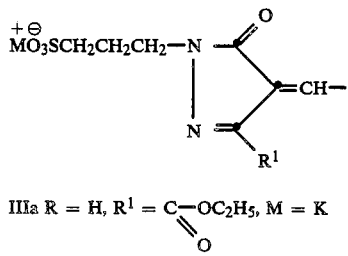

IIIa R = H, R¹ = C(=O)—OC₂H₅, M = K

IIIb R = H, R¹ = C(=O)—O⁻M⁺, M = K

IIIc R = H, R¹ = CH₃, M = K

Table II illustrates the unique combination of characteristics of the dye of this invention. Gelatin absorption max at 672 nm, compared to other dyes with 1-(2,5-disulfophenyl) substituents. It causes no unsensitization and is thus compatibility with the spectral sensitizing dye, does not desensitize the red sensitive emulsion, and has a good optical density (O.D.) and ratio of maximum to 600. Moreover, Dye 1 creates no post process stain or sludge.

under the "Background of the Invention" herein. The presence of the dye in the coating, either as an absorber dye or as a filter dye in the overcoat layer had no effect on the 365 line sensitivity. The dye did have a marked effect on the red sensitivity. The reduction in sensitivity was slightly larger in the coating where "sulfomethyl blue" was present as an absorber dye, possibly due to unsensitization.

Two coatings were prepared, labeled 4 and 5, analo-

TABLE II
EVALUATION OF ABSORBER DYES IN MULTILAYER FORMAT

| Dye | Sulfite Bleachability | Desens Emulsion | Causes Unsens | Dye Stain | OD Max | OD 600 | Ratio Max/600 | Absorption Max (nm) |
|---|---|---|---|---|---|---|---|---|
| 1 | Yes | No | No | No | 0.84 | 0.34 | 2.47 | 672 |
| Ia | Yes | No | No | No | 0.79 | 0.44 | 1.80 | 652 |
| Ib | Yes | No | No | No | 0.85 | 0.61 | 1.39 | 633 |
| Ic | Yes | Yes(si) | Yes | No | 0.68 | 0.36 | 1.89 | 660 |
| IIa | Yes | No | Yes | No | 0.78 | 0.46 | 1.70 | 668 |
| IIb | Yes | No | Yes | No | 0.76 | 0.57 | 1.35 | 690, 632 |
| IIc | Yes | No | Yes | No | 0.68 | 0.37 | 1.84 | 655 |
| IId | Yes | No | Yes | No | 0.79 | 0.32 | 2.47 | 667 |
| IIe | Yes | No | Yes | No | 0.64 | 0.42 | 1.52 | 640 |
| IIf | Yes | No | Yes | No | 0.90 | 0.47 | 1.91 | 663 |
| IIg | Yes | No | Yes | No | 0.78 | 0.40 | 1.95 | 661 |
| IIh | Yes | No | Yes | No | 0.55 | 0.18 | 3.06 | 682 |
| IIIa | Yes | No | Yes | No | 0.69 | 0.33 | 2.09 | 667 |
| IIIb | Yes | No | No | No | 0.82 | 0.51 | 1.61 | 651 |
| IIIc | Yes | No | Yes | No | 0.76 | 0.60 | 1.27 | 630 |

EXAMPLE 11

Comparison Between Dyes in the Overcoat Layer and the Dyes in the Red Sensitive Layer Table III contains a summary of results of certain other coating sets, prepared and processed as described in Example 3, which illustrate the invention in more detail.

A control (coating No. 1) in which no dye was added to either the red sensitive layer of the element or to the overcoat layer was prepared. The red sensitivity and the sensitivity to a 365 line exposure were determined. These exposures were used as references for comparing the sensitivities of the other coatings of the invention and of the prior art.

Two coatings, labeled 2 and 3, were prepared. Coating 2 contained the dye sulfomethyl blue (Dye IV) at the level indicated, in the red sensitive layer as an absorber dye, but not in an overcoat layer. Coating 3 contained the same dye at the same level in an overcoat layer and not in the red sensitive layer. Sulfomethyl blue is a currently used commercial dye mentioned gous to coatings to 2 and 3, respectively, except that the dye was the prior art oxonol dye IIa, identified in Example 3, instead of sulfomethyl blue. Dye IIa was added at a level less than half that of sulfomethyl blue. Dye IIa also had no effect on the 365 line sensitivity. Reduction of the red sensitivity of the coating when dye IIa was present as an absorber dye was severe. This added red sensitivity loss is the result of unsensitization of the spectral sensitizer by dye 5a.

Two coatings, 6 and 7, containing Dye 1 of this invention were prepared. Two coatings, 8 and 9, also contained Dye 1, but at a different level. Coatings 6–9 show that Dye 1 functions to reduce red sensitivity by attenuation of light, as in the coatings with the other dyes, but with no effect on the inherent sensitivity of the silver halide, as measured by the 365 line sensitivity. The additional sensitivity loss where the dye is present as an absorber dye is small.

TABLE III

| Coating No. | Dye | Level gm/m² | Relative Sensitivity Location | Red | 365 Line |
|---|---|---|---|---|---|
| 1 | — | — | — | 100 | 100 |
| 2 | IV | 0.054 | emulsion | 25 | 99 |
| 3 | IV | 0.054 | overcoat | 31 | 103 |
| 4 | IIa | 0.0215 | emulsion | 4.5 | 103 |
| 5 | IIa | 0.0215 | overcoat | 33 | 103 |
| 6 | 1 | 0.0215 | emulsion | 29.5 | 97 |
| 7 | 1 | 0.0215 | overcoat | 35.5 | 100 |
| 8 | 1 | 0.032 | emulsion | 24 | 98 |
| 9 | 1 | 0.032 | overcoat | 30 | 96 |

This data shows that the dyes of this invention perform as well as the commercially used sulfomethyl blue and better than structurally similar prior art used dyes, in that they leave no post process stain.

EXAMPLE 12

Performance Comparison of Dye 1 with Three Other Filter Dyes (Dyes Ib, IIa and IIe) in a Black and White Element Four dyes, 1, Ib, IIa and IIe, were evaluated in a silver halide element comprising a polyethylene terephthalate support upon which was coated an antihalation undercoat layer (AHU), a silver halide emulsion layer and an overcoat layer. The AHU comprised one of the dyes at the levels indicated, a mordant, copoly[styrene)$_{49.5}$(N,N-dimethylbenzylammonium chloride)$_{49.5}$(divinylbenzene)$_1$], at a level of 0.11 g/m² and gelatin at a coverage of 1.88 g/m².

The emulsion was a chemically sensitized 0.25µ silver bromoiodide emulsion containing 2.6 mole % iodide and spectrally sensitized to the green region with the dye, anhydro 9-methyl-3,3'-bis(3-sulfobutyl)thiacarbocyanine hydroxide, triethylammonium salt. It was coated to achieve a gelatin coverage of 1.61 g/m² and silver coverage of 1.45 g/m². The overcoat layer was coated to achieve gelatin coverage of 0.88 g/m². Samples of the coatings were exposed, both fresh and after incubation for seven days at 49° C. and 50% relative humidity, to a tungsten light source in a sensitometer, developed, fixed and washed in the Kodak Prostar ® process and dried.

The results are presented in Table IV. The sensitometric data demonstrate that none of the dyes had any appreciable effect on the light sensitive emulsion. This is important since even with the mordant present in the AHU there is always some migration of dyes into adjacent layers. The residual optical density (OD) is the OD, after processing, at λ-max of the coating. It is an indication of the degree of post processing stain due to the dye. The data show that both dyes IIa and IIe leave measurable amounts of residual dye in the coatings. These amounts can be detected visually. Dye Ib does not leave a measurable amount of stain at any level. Dye 1 leaves only a very slight stain at the highest level. Dye 1 absorbs at substantially longer wavelengths and provides more complete absorption in the red region as a whole and relatively less absorption in the green region. The advantage of this improved red absorption is demonstrated in Table IV.

TABLE IV

| Ctg No. | Dye | Level (g/m²) | λ-max | Fresh Fog | Fresh Rel Sens | Fresh D-max | Incubation Fog | Incubation Rel Sens | Incubation D-max | Resid OD |
|---|---|---|---|---|---|---|---|---|---|---|
| 1 | IIe | 0.02 | 655 | 0.07 | 100 | 2.12 | 0.07 | 105 | 2.13 | 0.012 |
| 2 | IIa | 0.01 | 685 | 0.06 | 107 | 2.10 | 0.06 | 110 | 2.12 | 0.007 |
| 3 | IIa | 0.02 | 685 | 0.06 | 100 | 2.09 | 0.06 | 100 | 2.08 | 0.015 |
| 4 | IIa | 0.03 | 685 | 0.06 | 91 | 2.09 | 0.06 | 87 | 2.07 | 0.018 |
| 5 | Ib | 0.01 | 650 | 0.06 | 110 | 2.10 | 0.06 | 112 | 2.11 | 0.000 |
| 6 | Ib | 0.02 | 650 | 0.06 | 102 | 2.08 | 0.06 | 105 | 2.12 | 0.000 |
| 7 | Ib | 0.03 | 650 | 0.06 | 95 | 2.10 | 0.06 | 97 | 2.11 | 0.000 |
| 8 | 1 | 0.01 | 690 | 0.06 | 112 | 2.15 | 0.06 | 115 | 2.14 | 0.000 |
| 9 | 1 | 0.02 | 690 | 0.06 | 102 | 2.10 | 0.06 | 107 | 2.08 | 0.000 |
| 10 | 1 | 0.03 | 690 | 0.06 | 97 | 2.12 | 0.06 | 100 | 2.13 | 0.004 |

EXAMPLE 13

Simulated Daylight Load Tests

Samples of the coatings described in Example 4 were evaluated for roomlight handling characteristics under simulated loading conditions. The sensitivity of the coating to roomlight is proportional to the number of convolutions of the coating strip in a roll in which roomlight exposure produces measurable developed density after processing. The larger the number of convolutions the greater the sensitivity of the film to room light. The results are presented in Table V. The data show that there is considerably better room light protection afforded by Dye 1 over Dye Ib at comparable levels.

TABLE V

| Ctg No. | Dye | Dye Level (gm/m²) | Convolutions |
|---|---|---|---|
| 1 | IIe | 0.02 | 6.7 |
| 2 | IIa | 0.01 | 7.3 |
| 3 | IIa | 0.02 | 5.4 |
| 4 | IIa | 0.03 | 5.4 |
| 5 | Ib | 0.01 | 9.4 |
| 6 | Ib | 0.02 | 8.0 |
| 7 | Ib | 0.03 | 7.3 |
| 8 | 1 | 0.01 | 7.6 |
| 9 | 1 | 0.02 | 6.4 |
| 10 | 1 | 0.03 | 5.8 |

The invention has been described in detail with particular reference to preferred embodiments thereof, but it will be understood that variations and modifications can be effected within the spirit and scope of the invention.

What is claimed is:

1. A photographic element comprising a support having thereon a radiation-sensitive silver halide emulsion layer and a hydrophilic colloid layer, which is the same as or different than the silver halide layer, comprising from about 1 to 1000 mg/m² of a dye having the formula:

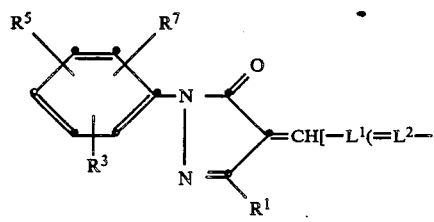

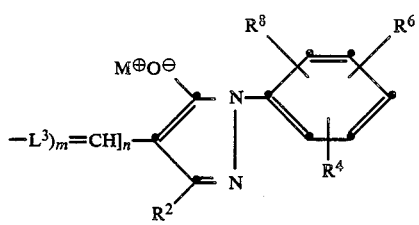

wherein $R^1$ and $R^2$ represent an aliphatic, alicyclic, or aromatic acyl group;

$R^3$, $R^4$, $R^5$, $R^6$, $R^7$, and $R^8$ each represent hydrogen or an acidic substituent capable of forming an anion, provided that (a) at least four of $R^3$, $R^4$, $R^5$, $R^6$, $R^7$, and $R^8$ are acidic groups and (b) at least two of such acidic groups are other than carboxy;

$L^1$, $L^2$, and $L^3$ each represent CH or CR where R is alkyl of up to four carbons; and $M^\oplus$ represents hydrogen or a monovalent cation and m and n each may be 0 or 1.

2. A photographic element according to claim 1 wherein the dye-containing layer is different from the silver halide layer and is located above the silver halide layer, with respect to the support.

3. A photographic element according to claim 2 wherein the support has thereon, in order, a blue-sensitive silver halide layer, a green-sensitive silver halide layer, a red-sensitive silver halide layer, and the dye-containing layer.

4. A photographic element according to claim 1 wherein the dye-containing layer is the same layer as the silver halide layer.

5. A photographic element according to claim 4 wherein the silver halide layer is red-sensitive and the dye is a red filter dye.

6. A photographic element according to claim 5, further comprising a blue-sensitive silver halide layer and a green-sensitive silver halide layer, wherein the support has thereon, in order, the blue-sensitive layer, the green-sensitive layer, and the red-sensitive layer.

7. A photographic element according to claim 1 wherein the dye-containing layer is different from the silver halide layer and is located between the support and the silver halide layer.

8. A photographic element according to claim 1 wherein the dye-containing layer is different from the silver halide layer and is located on the opposite side of the support as the silver halide layer.

9. A photographic element according to any of claims 1-8 wherein the dye has the formula:

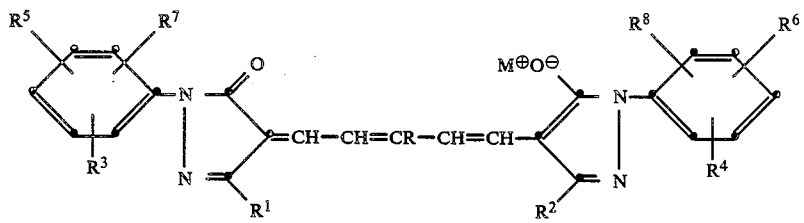

wherein

R is hydrogen or a lower alkyl of up to 4 carbon atoms;

$R^1$ and $R^2$ represent an aliphatic or alicyclic acyl group;

$R^3$, $R^4$, $R^5$, $R^6$, $R^7$, and $R^8$ each represent hydrogen or an acidic substituent capable of forming an anion, provided that (a) at least four of $R^3$, $R^4$, $R^5$, $R^6$, $R^7$, and $R^8$ are acidic substituents and (b) at least two of such acidic groups are other than carboxy; and $M^\oplus$ represents hydrogen or a monovalent cation.

* * * * *

UNITED STATES PATENT AND TRADEMARK OFFICE
CERTIFICATE OF CORRECTION

PATENT NO. : 4,877,721

DATED : October 31, 1989

INVENTOR(S) : Diehl et al.

It is certified that error appears in the above-identified patent and that said Letters Patent is hereby corrected as shown below:

Coumn 8, line 7, delete "EXAMPLE 3" and insert --EXAMPLE 5--.

Signed and Sealed this

Thirteenth Day of November, 1990

*Attest:*

HARRY F. MANBECK, JR.

*Attesting Officer*     *Commissioner of Patents and Trademarks*